United States Patent
Wilkerson

(10) Patent No.: US 6,788,207 B2
(45) Date of Patent: Sep. 7, 2004

(54) BRAKING RESPONSE AND FOLLOWING DISTANCE MONITORING AND SAFETY DATA ACCOUNTING SYSTEM FOR MOTOR VEHICLES AND OTHER TYPES OF EQUIPMENT

(76) Inventor: William Jude Wilkerson, 1430 Crofton Pkwy., Crofton, MD (US) 21114

( * ) Notice: Subject to any disclaimer, the term of this patent is extended or adjusted under 35 U.S.C. 154(b) by 0 days.

(21) Appl. No.: 10/349,511

(22) Filed: Jan. 22, 2003

(65) Prior Publication Data

US 2003/0128107 A1 Jul. 10, 2003

Related U.S. Application Data

(63) Continuation-in-part of application No. 09/808,734, filed on Mar. 15, 2001, which is a continuation-in-part of application No. 09/321,896, filed on May 28, 1999, now Pat. No. 6,204,757.
(60) Provisional application No. 60/087,137, filed on May 29, 1998.

(51) Int. Cl.$^7$ ............................................... G08B 23/00
(52) U.S. Cl. ...................... 340/576; 340/576; 340/435; 340/438; 340/439; 340/903; 701/28; 701/29; 701/35
(58) Field of Search ................................. 340/576, 903, 340/993, 435, 438, 439, 539.1; 701/28, 29, 35, 33, 45, 70; 180/271, 272, 290

(56) References Cited

U.S. PATENT DOCUMENTS

| | | | | |
|---|---|---|---|---|
| 4,833,469 A | * | 5/1989 | David .......................... 340/901 |
| 5,446,659 A | * | 8/1995 | Yamawaki ..................... 701/29 |
| 5,570,087 A | * | 10/1996 | Lemelson ............... 340/870.05 |
| 5,629,669 A | * | 5/1997 | Asano et al. ................ 340/436 |
| 5,699,040 A | * | 12/1997 | Matsuda ...................... 340/435 |
| 6,067,488 A | * | 5/2000 | Tano ............................ 701/35 |

* cited by examiner

Primary Examiner—Jeffery Hofsass
Assistant Examiner—Hung Nguyen
(74) Attorney, Agent, or Firm—Law Offices of Royal W. Craig

(57) ABSTRACT

An improved brake response time and following distance monitoring and safety data accounting system for motor vehicles and other types of human-operated equipment is herein disclosed. The present invention measures and records events where preset parameters are exceeded. Specifically, the present invention measures and records, among others, parameters associated with instantaneous vehicular following distance, average vehicular following distance, instantaneous changes in following distance, and brake response time of an operator. The system is equipped with data processing and communication means allowing an employer, a parent, an insurance carrier, or any other interested person to verify that the vehicle in question is operated in an appropriate manner. The present invention records each vehicle braking cycle to determine if previously established safe operating parameters were maintained while noting the date, time of day, and location of the incident. The information retrieved is compiled in a data record and stored in a storage system for instantaneous use or retrieval when desired.

20 Claims, 2 Drawing Sheets

BRAKING RESPONSE AND FOLLOWING DISTANCE MONITORING AND SAFETY DATA ACCOUNTING SYSTEM FOR MOTOR VEHICLES AND OTHER TYPES OF EQUIPMENT

CROSS-REFERENCE TO RELATED APPLICATIONS

The present application is a continuation-in-part of U.S. patent application Ser. No. 09/808,734 filed on Mar. 15, 2001, which application was a continuation-in-part of U.S. patent application Ser. No. 09/321,896 filed on May 28, 1999, now U.S. Pat. No. 6,204,757, which application was based on U.S. Provisional Application No. 60/087,137 filed on May 29, 1998.

BACKGROUND OF THE INVENTION

1. Field of the Invention

The present invention relates to systems for registering and recording the braking response time and average following distance for operators of commercial or private motor vehicles and other human-operated equipment. In particular, the present invention relates to systems for detecting, monitoring, and storing braking response time and following distance data, as well as other safety parameter data (e.g. acceleration/deceleration), for immediate usage or later retrieval.

2. Description of the Background

Safe operational conditions for any motor vehicle require its operator to exhibit adequate braking response time and reasonable judgement with regard to the distance at which he/she follows the vehicle directly in front. An operator's response time and judgement should not exceed parameters that (1) represent sensible driving tactics based on existing road conditions (i.e. parameters for good versus inclement weather conditions would vary), (2) represent sensible driving tactics based on existing road design (i.e. curving/winding roads, or uphill/downhill sections where the posted speed limit is incompatible with driving in good/excellent weather conditions), (3) may be indicated by excessive brake system wear, and (4) demonstrate that the vehicle has been operated in an unsafe manner.

In order to reduce insurance and other expenses caused by injuries to employees, employers of truck drivers or large commercial equipment operators often set forth safety policies including guidelines for vehicle operation. These typically include guidelines for braking that include parameters such as the weight of the vehicle being operated and the distance at which the vehicle operator follows the vehicle directly ahead. Maintaining an adequate following distance is critical in bringing a vehicle safely to a stop. Additionally, an operator's brake response time (i.e. the time between recognizing/acknowledging that the brakes need to be applied and the moment that the brake system is engaged) must be considered when establishing an appropriate following distance parameter. Unfortunately, the prior art devices lack any method of consistently and accurately measuring and recording an individual's operation of a vehicle, making the policing of any such guidelines extremely difficult.

Systems for monitoring vehicular use are well known in the prior art. For example, U.S. Pat. No. 5,754,964 to Rettig et al. discloses an apparatus and method for storing various vehicle operating characteristics upon sensing a vehicle acceleration having a magnitude that exceeds a predetermined limit. In this manner, the vehicle owner or fleet manager can determine whether the vehicle operator uses the service brakes excessively. While this invention is drawn specifically to the braking process, it does not include means for determining the average or instantaneous following distance to the vehicle immediately ahead or an operator's response time. It also fails to, during the braking event, record the time or position of the vehicle while the acceleration parameter is being measured.

A second example is that of U.S. Pat. No. 5,570,087 to Lemelson. It discloses a system and method for monitoring the performance of a motor vehicle. The vehicle's instantaneous accelerations in at least two directions are continually sensed and stored as coded signals in a computer memory along with associated time and date codes. By means of inertial navigation and/or radio transmissions from global positioning system satellites, the vehicle's global position is also computed and stored. The stored performance variables are analyzed over a period of time in order to evaluate how the vehicle is being driven. When an erratic or otherwise hazardous driving pattern is detected, signals may be generated to warn the driver and/or traffic authorities. However, this system also fails to include means for determining the average or instantaneous following distance to the vehicle immediately ahead or an operator's response time.

In light of the above information, it would, therefore, be advantageous to provide a system for accurately and consistently measuring and recording the brake response time and average following distance for the operators of private/commercial vehicles and heavy equipment. Operational liability could be reduced if unsafe braking practices/habits could be identified and corrected for any given operator, inclusive of factors such as road, vehicle, or weather conditions.

SUMMARY OF THE INVENTION

It is, therefore, an object of the present invention to provide a system for detecting, measuring, and recording the brake response time and average following distance for the operators of private/commercial vehicles and heavy equipment.

It is another object of the present invention to provide a system for measuring and recording other safety-related information in such vehicles, such as date/time of occurrence and vehicle position.

It is a further object of the present invention to organize the data retrieved from the various sources herein described into a usable and consistent record, which can then be compiled with like records to analyze brake response time, following distance, and other safety parameters in a comprehensive and statistical manner.

It is a further object of the present invention to provide the above objects in an economical and facile manner, using existing, commercially available components to the extent practical.

In accordance with the above objects, an improved brake response time and following distance monitoring and safety data accounting system is provided which measures and records events where preset parameters are exceeded. Specifically, the present invention measures and records, among others, parameters associated with instantaneous vehicular following distance, average vehicular following distance, instantaneous changes in following distance, and brake response time of an operator. The system is equipped with data processing and communication means allowing an employer, a parent, an insurance carrier, or any other interested person to verify that the vehicle in question is operated in an appropriate manner. The present invention records each vehicle braking cycle to determine if previously established safe operating parameters were maintained while noting the date, time of day, and location of the incident. The information retrieved is compiled in a data record and stored in a storage system for instantaneous use or retrieval when desired.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
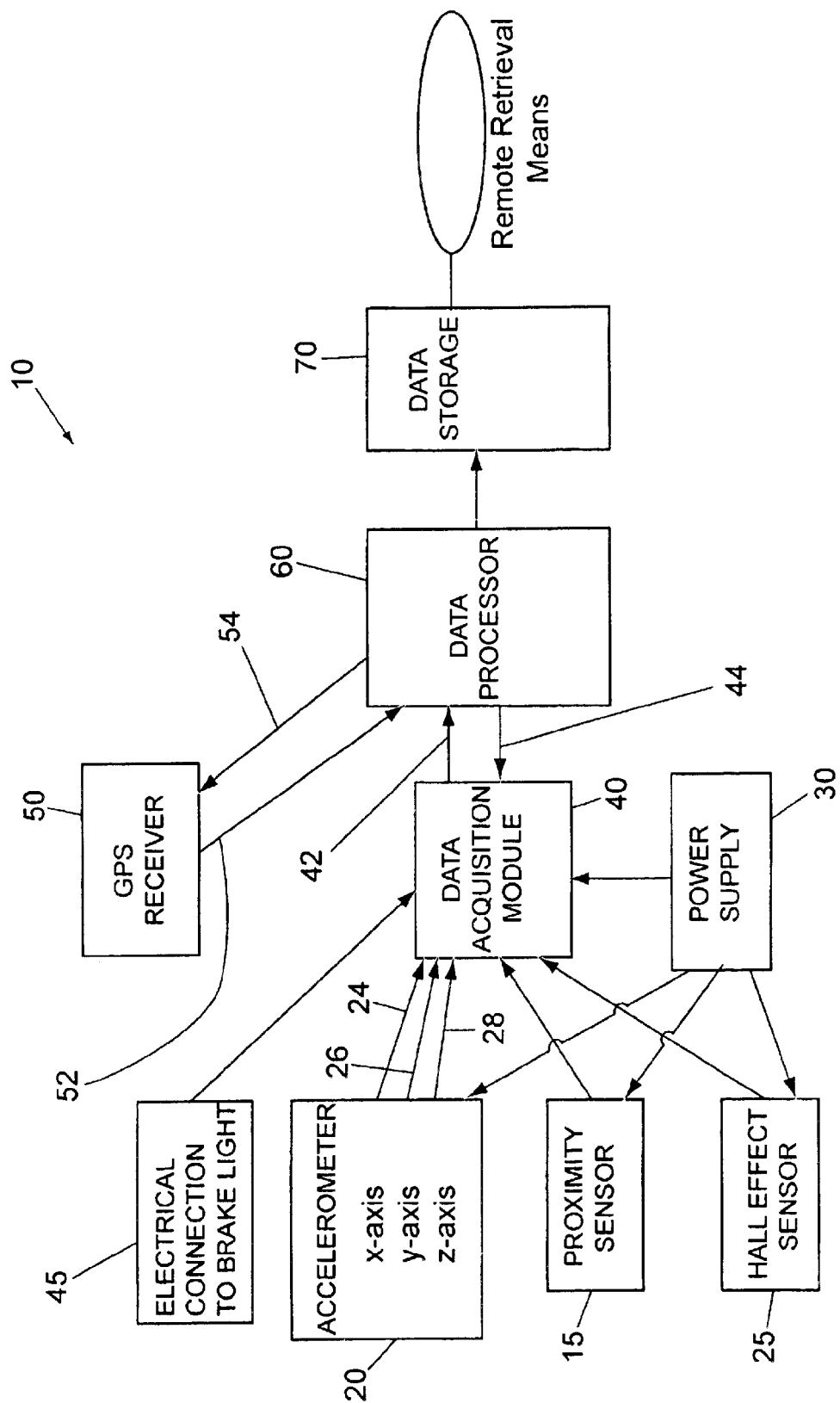
FIG. 1 is a schematic block diagram showing the braking response and following distance monitoring and safety data accounting system 10 according to a preferred embodiment of the present invention.

As shown in the schematic block diagram of FIG. 1, the braking response and following distance monitoring and safety data accounting system 10 of the present invention generally comprises a proximity sensor 15, a multiple axis accelerometer 20, a Hall effect sensor 25, a data acquisition module 40 to receive analog signal inputs from the sensors 15, 25 and accelerometer 20, a power supply 30 for the sensors 15, 25, accelerometer 20 and module 40, a direct electrical connection 45 to the vehicle's brake light, a global positioning receiver 50 to record the vehicle location and time reference, processing means 60 programmed to poll the data acquisition module 40 and the global positioning receiver 50 and compile a unified data record, and storage means 70 for storage of the unified data records for later retrieval.

The proximity sensor 15 may be any well-known and commercially available unit which is equipped with appropriate measurement capability. The sensor 15 must be capable of determining the distance to an object positioned directly in front of it. A preferred sensor 15 may be the 77 Ghz., pulsed Doppler, forward looking radar unit commercially available from M/A-COM, although any standard sensor capable of appropriate distance measurement would suffice. The sensor 15, housed in a casing, is rigidly attached at the front of the vehicle and positioned to target any vehicle/object directly ahead. A power supply 30, typically the vehicle 12 volt DC, is preferably drawn from the vehicle's electrical system and regulated to operate the sensor 15.

The accelerometer 20 may be any well-known and commercially available unit which is equipped with appropriate multi-axis measurement capability. The accelerometer 20 must be capable of detecting vehicle acceleration (or deceleration) in both the horizontal and vertical planes (i.e. the X-, Y-, and Z-axes). A preferred accelerometer 20 is the Model CXL04M3 unit commercially available from Crossbow Technology, Inc., although any standard accelerometer capable of measurement along three axes of movement would suffice. Analog Devices' Model ADXL202 is another example of an accelerometer capable of achieving sufficient accuracy at low cost. The accelerometer 20, typically possessing either a plastic or an aluminum casing, is rigidly attached to the frame of the vehicle. A power supply 30, typically less than 12 volts, is preferably drawn from the vehicle's electrical system to operate the accelerometer 20.

An electrical connection 24 carries the analog third signal (acceleration along the X-axis) from the accelerometer 20 to the data acquisition module 40. Parallel electrical connections 26, 28 carry the fourth (acceleration along the Y-axis) and fifth (acceleration along the Z-axis) analog signals, respectively, between the two devices. In accordance with the preferred embodiment, the data acquisition module 40 may be a commercially available unit manufactured by B&B Electronics as part number 2320PSDA. This particular optically isolated serial data acquisition module 40 provides two digital I/O lines and six A/D input channels. Of the six input channels, four possess signal conditioning circuitry. It can be readily mounted anywhere in the vehicle to provide convenient access for the wiring of the sensors 15, 25 and accelerometer 20, or any other analog input circuitry.

The Hall effect sensor 25 may be any well-known and commercially available unit which is equipped with appropriate measurement capability. The sensor 25 must be capable of determining the rotational velocity of an object positioned proximate the sensor 25. A preferred sensor 25 may be the Hall effect sensor commercially available from B&B Electronics as part number HE6150, although any standard sensor capable of appropriate rotational velocity measurement would suffice. The hall effect sensor 25 includes an electronic pickup and remote magnetic sensors attached by wires to the electronic pickup. The Magnetic sensors are deployed proximate the rotating lobes of the vehicle's main drive shaft universal joint in order to determine the vehicle's speed. A power supply 30, typically less than 12 volts, is preferably drawn from the vehicle's electrical system to operate the electronic pickup of the hall effect sensor 25.

The direct electrical connection 45 to the vehicle's brake light is included to provide the data acquisition module with an indication that the operator's foot has made contact with the brake pedal and initiated a braking event.

The present invention requires that an event date/time and vehicle position record be made simultaneous to any braking event record. A particularly preferred global positioning receiver 50 is commercially available from Mitel Semiconductor as part number GP2000. This particular global positioning receiver component has been used to build a variety of commercially available, hand held Global Positioning System (GPS) products, and is well suited for incorporation with a processor and peripherals for storage within one housing. For purposes of the present invention, the housing may be mounted on the vehicle in a location convenient for servicing the system and for making the required connection to retrieve unified data records. It should be readily apparent to one of ordinary skill in the relevant art that if position data is not needed in a given embodiment, the global positioning receiver 50 can be replaced with an electronic timepiece that provides only a time data record to processor 60. Further, various embodiments of processor 60 already employ a time clock that can provide a time reference to processor 60.

With further reference to FIG. 1, a serial data connection 42 carries the unified data record, which reflects the analog signals from the sensors 15, 25 and the analog first, second, and third signals from the accelerometer 20, and any other analog safety data signals herein contemplated, from the data acquisition module 40 to the processor 60. Likewise, a serial data connection 52 carries the unified data record reflecting the position and date/time signals from the global positioning receiver 50 to the processor 60.

In accordance with the preferred embodiment, a suitable processor 60 is the commercially available unit manufactured by Toshiba as part number TMPR3922U. This CPU application is based on Toshiba's TX39 MIPS RISC processor core, and is designed for compact applications such as personal digital assistants and interactive communication devices. An alternative processor 60 is the commercially available unit manufactured by Adastra Systems as part number P-586, which is a self-contained embedded system based on an Intel Pentium-class microprocessor. Both of the illustrative processors are capable of polling the data acquisition module 40 through a data connection 44, and the global positioning receiver 50 through a data connection 54, at discrete time intervals or at the occurrence of a discrete event. In either case, the processor 60 may be contained in the same housing as the global positioning receiver 50, is supported by all standard and necessary peripheral components including RAM memory, and is powered from the vehicle's electrical distribution system.

The processor 60 is controlled by resident software written to identify and record braking events. Parameters (e.g. vehicle speed, following distance to vehicle immediately ahead) for braking events based on vehicle type and/or weight, as established by authorized safety personnel, are resident in the software. The software facilitates the generation of polling events whenever one or more of the parameters is exceeded, polls the various analog and digital inputs at specified time intervals as long as a parameter remains in an exceeded condition, and compiles the resulting unified data records for storage or instantaneous monitoring/recording. The software may comprise a sequence of well known and commercially available real time control modules preferably authored in the C++ programming language, and compiled with a commercially available compiler that is compatible with the processor class employed and specially tailored for embedded systems. Once the processor 60 has polled the various sensor 15, 25 and accelerometer 20 data inputs, the processor 60 compiles a unified data record in one of many known standardized formats for storage in storage means 70. In the preferred embodiment, the storage means 70 is commercially available digital memory such as DRAM or SDRAM. It should be readily apparent to one of ordinary skill that commercially available flash memory, magnetic disc memory, or optical memory can be employed as the storage means 70. Flash memory has the added advantage that it comes in the form of cards that are compact and easy to transport to a remote computer for analysis. Furthermore, they do not require a continuous power supply to retain data.

Moreover, it should be readily apparent to one of ordinary skill in the art of the present invention that the retrieval of the unified data records from the storage means 70 need not be accomplished by a physical connection between the processor 60 and the storage means 70. The retrieval of the unified data records can be easily accomplished by the incorporation of IP modem technology communicating with the processor 60 and digital cellular communications to relay data from the IP modem of the vehicle system to an IP modem at a remote location, in conjunction with the storage means 70 at the remote location. Satellite telecommunication services can also be used in place of digital cellular communication services.

Exemplary programming and use of a preferred embodiment of the brake response and following distance monitoring and safety data accounting system 10 is as follows:

Vehicle speed is sensed and calculated by the Hall effect sensor 25 which is continuously polled by the processor 60. A series of data records are generated indicating the amount of time, calculated to thousandths of a second, that the vehicle spends in any one of a predetermined series of speed ranges. Specifically, the ranges are >0–10 mph, >10–20 mph, >20–30 mph, >30–40 mph, >40–50 mph, >50–60 mph, >60–70 mph, and >70–80 mph. Higher speed rangs may be included if required. Individual data records are generated for each of the ranges, as the vehicle accelerates or decelerates, indicating the amount of time the vehicle's speed remains within that 10 mph interval.

Concurrent with the compilation of the above data records, the processor 60 continuously monitors input from the proximity sensor 15 and records, at 0.25 second intervals, the distance (in feet) from the sensor 15 (i.e. front end of the vehicle being operated/monitored) to the rear end of the vehicle, or any other object, immediately ahead. Others skilled in the art will realize that distances may be measured in units other than feet (e.g. meters) and that the time interval may be more or less than 0.25 seconds. This information is compiled with the corresponding vehicle speed data record to calculate and record, among others, average values for following distance (i.e. sum of distance measurements divided by number of measurements) within each of the above listed 10 mph speed ranges.

Data records are compiled, within the resident software, over a user-definable period as follows: All like data records (e.g. >0–10 mph, >10–20 mph, >20–30 mph, etc.) are grouped and a statistical analysis is performed to determine a weighted average for following distance in each speed range. Further statistical analysis is performed to buffer outlying data due to anomalous conditions (e.g. lane changes, non-moving/stationary objects, turns, etc.). The software also generates a single weighted average for all ranges that may be used as a driver evaluation tool. Raw data records may either be saved for later investigation (e.g. route characteristics, accident reconstruction, other significant events) or can be purged at the end of the period.

Concurrent with the compilation of the above described data records, the present invention continuously monitors the distance measurement provided by the proximity sensor 15, at each 0.25 second interval, for negative changes in that distance, defined as a closing velocity event (CV). If, during any 0.25 second interval, the preset value for a specified parameter (see the "Negative change in following distance" column in the table below) associated with the applicable 10-mph speed range is equaled or exceeded and the distance between the front end of the monitored vehicle and the back end of the leading vehicle satisfies a second specified parameter (see the "When following distance is" column of the table), a CV is deemed to have occurred and the system 10 is prompted to record the time of the CV's occurrence. Input from the direct electrical connection 45 to the vehicle's brake light will then be polled for time of activation (i.e. the operator's application of the brakes). Recommended values, for each 10 mph speed range, for the negative change in following distance and following distance parameters are outlined in the table below:

| Speed Range | Negative change in following distance | When following distance is: |
| --- | --- | --- |
| >0–10 mph | 0.75 ft. | <15 ft. |
| >10–20 mph | 1.15 ft. | <25 ft. |
| >20–30 mph | 1.40 ft. | <35 ft. |
| >30–40 mph | 1.70 ft. | <45 ft. |
| >40–50 mph | 2.00 ft. | <55 ft. |
| >50–60 mph | 2.25 ft. | <65 ft. |
| >60–70 mph | 2.25 ft. | <75 ft. |
| >70–80 mph | 2.25 ft. | <85 ft. |

The preset values may be altered to suit the needs of any specified driving circumstance (e.g. city versus highway driving conditions). GPS data coupled with appropriate software may also be used to automatically alter preset values.

The system 10 may then compute the difference between the time of the CV and the time of brake activation by the operator to compile a data record reflecting brake response times for each speed range. Data records are compiled, within the resident software, over a user-definable period as follows: All like data records are grouped and a statistical analysis is performed to determine a weighted average for operator brake response time in each speed range. Further statistical analysis is performed to buffer outlying data due to anomalous conditions. The software also generates a single weighted average for all ranges that may be used as a driver evaluation tool.

Concurrent with the compilation of the above data records, when a CV occurs the processor 60 may continuously monitor input from the accelerometer 20 to determine the exact time that deceleration begins, which indicates the moment when the operator's foot is removed from the gas pedal. This data record can be compared with the time that the brake pedal is actually applied for each CV. Also, a data record may compiled which measures the intensity and duration of each braking event, via the deceleration measured by the accelerometer 20

Figure 2:
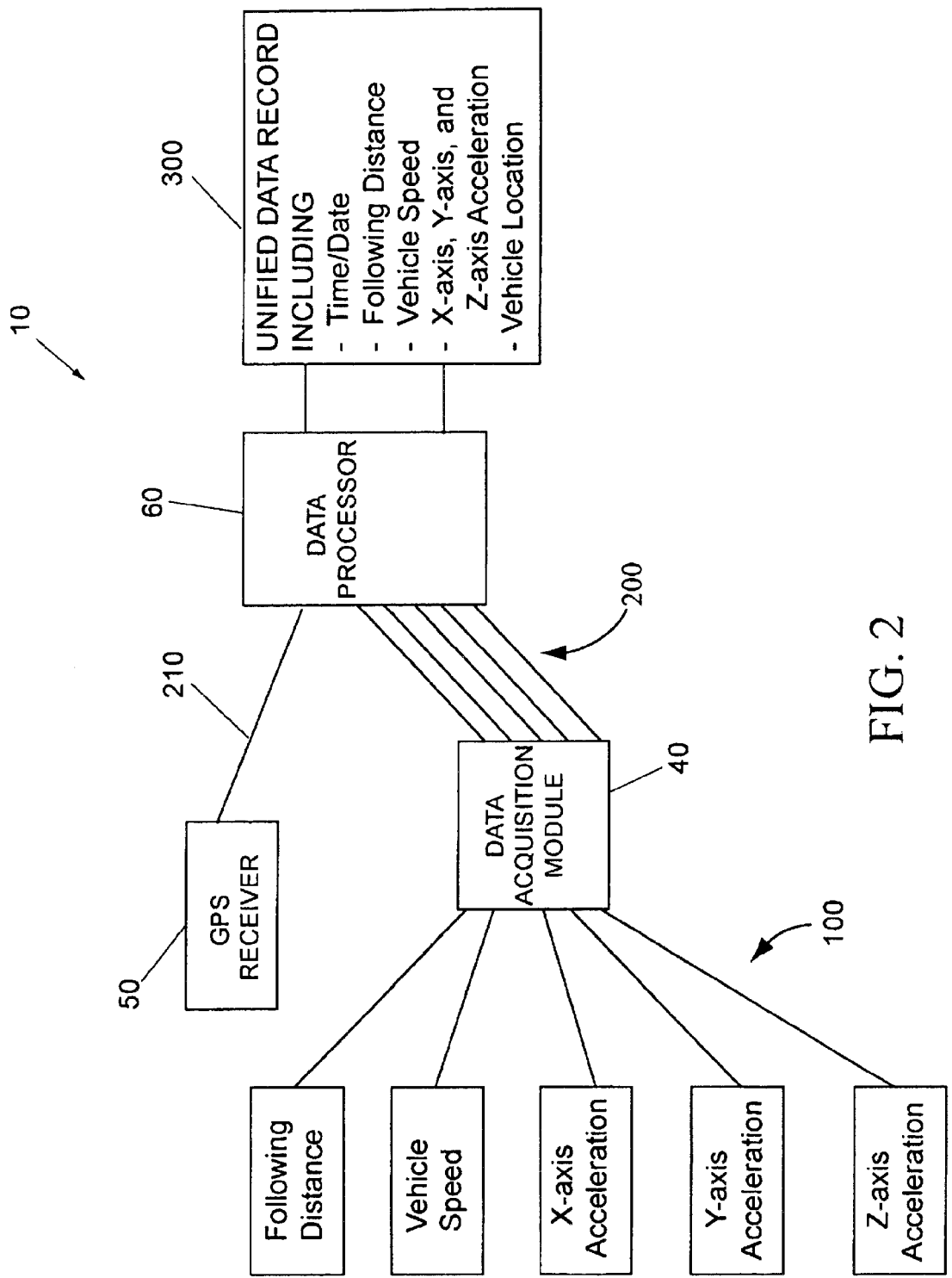
FIG. 2 is a schematic diagram illustrating the functionality of the electronic data portions of the braking response and following distance monitoring and safety data accounting system 10 according to a preferred embodiment of the present invention.

FIG. 2 is a schematic diagram of the functionality of the electronic data portions of the brake response and following distance monitoring and safety data accounting system 10 according to a preferred embodiment of the present invention. Analog inputs 100 such as following distance, vehicle speed, and the X-, Y-, and Z-axis components of vehicle acceleration are processed by the data acquisition module 40 into digital inputs 200. Additional inputs 210, such as those from the GPS unit 50 (e.g. vehicle position, date/time records), may already be in a compatible digital form for processing. The processor 60 compiles a unified data record 300 which contains fields for each of the desired data in the record, at least including (1) following distance, (2) vehicle speed, (3) X-axis acceleration, (4) Y-axis acceleration, (5) Z-axis acceleration, (6) GPS coordinate data for vehicle position, and (7) date/time information. The foregoing information is stored as a unified data record for later retrieval. The record can be queried for patterns of inappropriate braking or brake response due to maintaining inappropriate following distances. Specific events and pattern data can be compared to baseline parameters to ensure that a given driver follows proper guidelines such as: (1) employing sensible driving tactics based on existing road conditions (i.e. parameters for good versus inclement weather conditions would vary), (2) employing sensible driving tactics based on existing road design (i.e. curving/winding roads, or uphill/downhill sections where the posted speed limit is incompatible with driving in good/excellent weather conditions), (3) avoiding excessive brake system wear, and (4) generally operating the vehicle in a safe manner.

The above-described system accurately and consistently measures and records the brake response time and average following distance for the operators of vehicles, and especially private/commercial vehicles and heavy equipment. The system also measures other safety-related information in such vehicles, organizes the data retrieved from the various sources herein described into a usable and consistent record, which can then be compiled with like records to analyze brake response time, following distance, and other safety parameters in a comprehensive and statistical manner. The data can be used to monitor compliance with safety policies and guidelines for vehicle operation in order to reduce insurance and other expenses caused by injuries to employees, employers of truck drivers or large commercial equipment operators.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

We claim:

1. A brake response and following distance monitoring and safety data accounting system for a human-operated vehicle comprising:

following distance measurement means for generating a first signal when an object immediately in front of said vehicle is detected;

speed measurement means for generating a second signal when said vehicle is moving forward;

acceleration/deceleration indicating means for generating a third signal when acceleration or deceleration of said vehicle, in the direction of an X-axis, is detected;

acceleration/deceleration indicating means for generating a fourth signal when acceleration or deceleration of said vehicle, in the direction of a Y-axis, is detected;

acceleration/deceleration indicating means for generating a fifth signal when acceleration or deceleration of said vehicle, in the direction of a Z-axis, is detected;

processor means for receiving said first, second, third, fourth, and fifth signals and constructing a unified data record at a plurality of predetermined time intervals; and storage means for compiling a plurality of said unified data records for immediate review or later retrieval;

wherein said unified data record comprises contemporaneous following distance, speed, and X-axis, Y-axis, and/or Z-axis acceleration/deceleration data providing a record of a human operator's habits and performance with regard to the operation of said vehicle.

2. The system of claim 1, further comprising time and date indicating means for generating a time/date data record;

wherein said processor means receives and incorporates said time/date data record into said unified data record.

3. The system of claim 1, further comprising global positioning means for generating a position data record;

wherein said processor means receives and incorporates said position data record into said unified data record.

4. The system of claim 1, wherein said acceleration/deceleration indicating means comprises a multi-axis accelerometer responsive to acceleration/deceleration in any of three axes of motion.

5. The system of claim 1, wherein said processor means is comprised of an embedded microcomputer.

6. The system of claim 5, wherein said processor means further comprises an analog-to-digital conversion means for receiving said first, second, third, fourth, and fifth signals.

7. A brake response and following distance monitoring and safety data accounting system for a human-operated vehicle comprising:

following distance measurement means for generating a first signal when an object immediately in front of said vehicle is detected;

speed measurement means for generating a second signal when said vehicle is moving forward;

acceleration/deceleration indicating means for generating a third signal when acceleration or deceleration of said vehicle, in the direction of an X-axis, is detected;

acceleration/deceleration indicating means for generating a fourth signal when acceleration or deceleration of said vehicle, in the direction of a Y-axis, is detected;

acceleration/deceleration indicating means for generating a fifth signal when acceleration or deceleration of said vehicle, in the direction of a Z-axis, is detected;

processor means for receiving said first, second, third, fourth, and fifth signals and constructing a unified data record at the occurrence of a plurality of discrete events; and storage means for compiling a plurality of said unified data records for immediate review or later retrieval;

wherein said unified data record comprises contemporaneous following distance, speed, and X-axis, Y-axis, and/or Z-axis acceleration/deceleration data providing a record of a human operator's habits and performance with regard to the operation of said vehicle.

8. The system of claim 7, wherein said discrete events comprise a decrease in the following distance and/or a decrease in the speed of said vehicle.

9. The system of claim 7, further comprising time and date indicating means for generating a time/date data record;

wherein said processor means receives and incorporates said time/date data record into said unified data record.

10. The system of claim 7, further comprising global positioning means for generating a position data record;

wherein said processor means receives and incorporates said position data record into said unified data record.

11. The system of claim 7, wherein said acceleration/deceleration indicating means comprises a multi-axis accelerometer responsive to acceleration/deceleration in any of three axes of motion.

12. The system of claim 7, wherein said processor means is comprised of an embedded microcomputer.

13. The system of claim 12, wherein said processor means further comprises an analog-to-digital conversion means for receiving said first, second, and third signals.

14. A method of brake response and following distance monitoring and safety data accounting for a human-operated vehicle comprising:

detecting a following distance between said vehicle and an object immediately in front of said vehicle;

detecting a speed of said vehicle when moving forward;

detecting acceleration/deceleration of said vehicle in the direction of an X-axis;

detecting acceleration/deceleration of said vehicle in the direction of a Y-axis;

detecting acceleration/deceleration of said vehicle in the direction of a Z-axis;

constructing a unified data record at a plurality of intervals; and storing said unified data records for immediate review or later retrieval;

wherein said unified data record comprises contemporaneous X-axis, Y-axis, and/or Z-axis acceleration/deceleration data providing a record of a human operator's habits and performance with regard to the operation of said vehicle.

15. The method of claim 14, further comprising the step of forming a time/date data record;

wherein said unified data record further comprises said time/date data record.

16. The method of claim 14, further comprising the step of forming a position data record;

wherein said unified data record further comprises said position data record.

17. The method of claim 14, wherein said plurality of intervals comprise the detection of acceleration or deceleration in the direction of the X-axis, Y-axis, and/or Z-axis.

18. The method of claim 14, wherein said plurality of intervals comprise predetermined time intervals.

19. The method of claim 18, further comprising the step of forming a time/date data record;

wherein said unified data record further comprises said time/date data record.

20. The method of claim 18, further comprising the step of forming a position data record;

wherein said unified data record further comprises said position data record.

* * * * *